United States Patent
Kumar

[19]

[11] Patent Number: 5,998,880
[45] Date of Patent: Dec. 7, 1999

[54] AC LOCOMOTIVE OPERATION WITHOUT DC CURRENT SENSOR

[75] Inventor: Ajith Kuttannair Kumar, Erie, Pa.

[73] Assignee: General Electric Company, Erie, Pa.

[21] Appl. No.: 08/908,259

[22] Filed: Aug. 7, 1997

[51] Int. Cl.[6] .................................. F02N 11/06; H02P 9/04
[52] U.S. Cl. .................. 290/40 B; 290/40 A; 290/40 C; 290/40 D; 290/40 E; 290/40 F; 322/10; 322/14; 322/24
[58] Field of Search .............................. 290/40 A, 40 B, 290/40 C, 40 D, 40 E, 40 F; 318/439, 254, 721, 431, 801; 322/10, 14, 24, 46, 20

[56] References Cited

U.S. PATENT DOCUMENTS

| | | | |
|---|---|---|---|
| 4,634,887 | 1/1987 | Balch et al. | 290/402 |
| 5,363,032 | 11/1994 | Hanson et al. | 322/10 |
| 5,467,025 | 11/1995 | Ray | 324/772 |
| 5,495,162 | 2/1996 | Rozman et al. | 322/10 |
| 5,600,218 | 2/1997 | Holling et al. | 318/439 |
| 5,646,510 | 7/1997 | Kumar | 290/402 |
| 5,703,449 | 12/1997 | Nagate et al. | 318/254 |
| 5,712,802 | 1/1998 | Kumar et al. | 290/402 |
| 5,729,113 | 3/1998 | Jansen et al. | 318/799 |
| 5,747,971 | 5/1998 | Rozman et al. | 322/10 |
| 5,783,917 | 7/1998 | Takekawa | 318/439 |

OTHER PUBLICATIONS

"Open Loop Electronic Cyliner Pressure Balancing for Diesel Engine in Locomotive Application," R. Volpe, Jr., SA Patel, Serial No. 08/813,124 (GE docket 20–DD–1825) filed Mar. 7, 1997.

*Primary Examiner*—Elvin G. Enad
*Attorney, Agent, or Firm*—Jill M. Breedlove; Douglas E. Stoner

[57] ABSTRACT

A system and method for controlling operation of a diesel electric traction vehicle of the type including a synchronous generator driven by a diesel engine for producing alternating current (AC) electric power, the AC electric power being converted to direct current (DC) electric power and transferred over a DC link to a plurality of DC to AC inverters, and each of the inverters being coupled to transfer controlled frequency power to at least one AC electric traction motor coupled in driving relationship to at least one wheel-axle set of the vehicle. A computer-based control system controls operation of the engine, generator and inverters in response to a power command signal. The control system computes power supplied by the generator from calculated torque developed by the AC traction motors and electric power losses in the inverters and other circuit elements coupling power from the generator to the motors. The computed generator supplied power is compared to the power command signal and engine operation is adjusted so as to minimize any difference between the commanded power and the computed power.

8 Claims, 4 Drawing Sheets

5,998,880

AC LOCOMOTIVE OPERATION WITHOUT DC CURRENT SENSOR

BACKGROUND OF THE INVENTION

This invention relates generally to electrical propulsion systems for diesel electric locomotives equipped with alternating current traction motors and, more particularly, to a method for controlling locomotive operation without use of a direct current sensor.

In a conventional diesel electric locomotive, a thermal prime mover (typically a 16 cylinder turbo-charged diesel engine) is used to drive an electrical transmission comprising a synchronous generator that supplies electric current to a plurality of alternating current (AC) traction motors whose rotors are drivingly coupled through speed reducing gearing to the respective axle wheel sets of the locomotive. The generator typically comprises a main three-phase traction alternator, the rotor of which is mechanically coupled to the output shaft of the diesel engine. When excitation current is supplied to field windings on the rotating rotor, alternating voltages are generated in three-phase armature windings on the stator of the alternator. These voltages are rectified to produce a controlled amplitude DC voltage on a DC link which is connected to DC terminals of one or more inverters. The inverters invert the DC voltage to a controlled frequency of AC power to be supplied to the field windings of the AC traction motors. The effective AC excitation frequency produced by the inverters controls the speed of the AC motors with power being controlled by pulse width modulation of the AC waveform.

In normal motoring operation, the propulsion system of the diesel electric locomotive is so controlled as to establish a balanced steady state condition wherein the engine driven alternator produces, for each discrete position of a throttle handle, a substantially constant optimum amount of electrical power for the traction motors.

The propulsion control system conventionally includes means for limiting or reducing alternator output voltage as necessary to keep the magnitude of the DC link voltage and the magnitude of DC link current from exceeding respective predetermined safe maximum levels or limits. Typically, both the DC link voltage and the DC link current are monitored with appropriate sensors which provide both a feedback control of the propulsion system operation and also serve to prevent over-voltage and/or over-current conditions. At low locomotive speeds, the traction motor armatures are rotating slowly so that their back EMF is low. A low alternator voltage can now produce a maximum motor current which in turn produces the high tractive effort required for acceleration. On the other hand, the alternator voltage magnitude must be held constant and at a high magnitude whenever locomotive speed is high since the traction motor armatures are rotating rapidly and have a high back EMF and the alternator voltage must be high to produce the required load current.

In addition to providing current feedback signals for controlling alternator operation during motoring (a propulsion mode of operation of the locomotive in which the AC motors are powered to drive the locomotive in either a forward or reverse direction), the DC link current sensor is also used to control engine operation during self-loading (a test mode with the locomotive at rest in which alternator power is dissipated in a dynamic braking resistance grid coupled to the DC link) to test engine, alternator and associated controls. The DC link current sensor also provides inputs to a failure detection circuit for identifying short-circuit currents associated with a shoot-through condition typically caused by switching device failures in one of the inverters or any other shorted condition at or reflected onto the DC link. Accordingly, the DC current sensor at the DC link has been considered to be a necessary feature for locomotive systems.

A detriment of the DC link current sensor is its relatively high cost. Further, failure of the sensor may require shutting down the associated locomotive. The DC link current sensor is unusual because of the need to monitor a wide range of DC current, e.g., anywhere from a few tens of amperes up to several thousand amperes. Additionally, the sensor is connected in a relatively high voltage circuit, e.g., the nominal DC link voltage may be about 1400 volts but can spike up above 2000 volts. Accordingly, it is desirable to provide a method for overcoming the cost and failure disadvantages associated with use of a conventional DC link current sensor.

SUMMARY OF THE INVENTION

The present invention comprises a system and method which obviate the need for a DC link current sensor in an AC traction motor vehicle system. All of the functions performed by the DC link current sensor in an AC traction motor vehicle system are implemented using existing measured parameters.

In an illustrative embodiment, the invention is implemented in a diesel electric locomotive of the type including a diesel engine connected in driving relationship to an electric power generator, power output terminals of the generator being connected to input terminals of an alternating current (AC) to direct current (DC) power converter and output terminals of the power converter being connected to relatively positive and relatively negative DC buses of a DC link. A plurality of DC to AC inverters are connected in parallel to the DC link with each of the inverters being connected for supplying controlled AC power to at least one AC electric traction motor coupled in driving relationship to wheels of the locomotive. A control system is connected for controlling the power output of the inverters in response to an operator's command and to sensed operating conditions of the locomotive, one of the sensed operating conditions being power output of the generator.

During normal motoring of the locomotive, power output of the generator is determined indirectly by calculating the torque developed by each of the traction motors and converting the calculated torque to equivalent electrical power. The system losses, i.e., losses in the inverter and snubber circuits plus resistance losses in the electrical conductors, are added to the equivalent electrical power to arrive at the generator power output or, more precisely, the power supplied to the DC link. Motor torque and system losses can all be calculated using existing measured variables. For example, motor torque is determined from measured values of motor stator voltage and current, both of which are AC parameters that are commonly monitored with AC sensors. Torque is obtained from a conventional motor equivalent circuit transformation using the measured voltage and current values. Electrical power input to the motor is then obtained by multiplying the torque value by the frequency of the power applied to the motor. Power losses in the inverter switching devices are calculated using known techniques such as described in U.S. patent application Ser. No. 08/633,390. Snubber losses in the inverters are determined using conventional methods, e.g., in an illustrative snubber using a capacitor and inductor, losses in the capacitor are determined by the relationship $CV^2f$ while losses in the inductor are determined from the relationship $1/2\ Li^2$, where f is inverter switching frequency, C and L are capacitor and inductor values, and V and i are the voltage and current from the inverter. Resistive losses are calculated from the measured AC current and cable resistance between the motors and the DC link.

During self loading of the locomotive, power generation is readily determined by dividing the square of the DC link voltage by the resistance of the dynamic brake grid.

Failure detection for an inverter shoot-through is obtained from monitoring DC link voltage and detecting sudden drops in the voltage to about zero volts and the existence of such low voltage for more than some minimum time period. A shorted DC link (a start-up failure) requires a computer model of the alternator, i.e., a model which relates alternator output current to alternator output voltage as a function of alternator field current and rotor speed. From the model, a value of estimated output current can be obtained from the measured values of voltage, speed and field current. If the value of estimated load resistance obtained by dividing DC link voltage by the estimated current is less than a selected minimum value and the value of estimated current is greater than another selected value for a minimum time interval, then a short-circuit is presumed and the locomotive is disabled.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
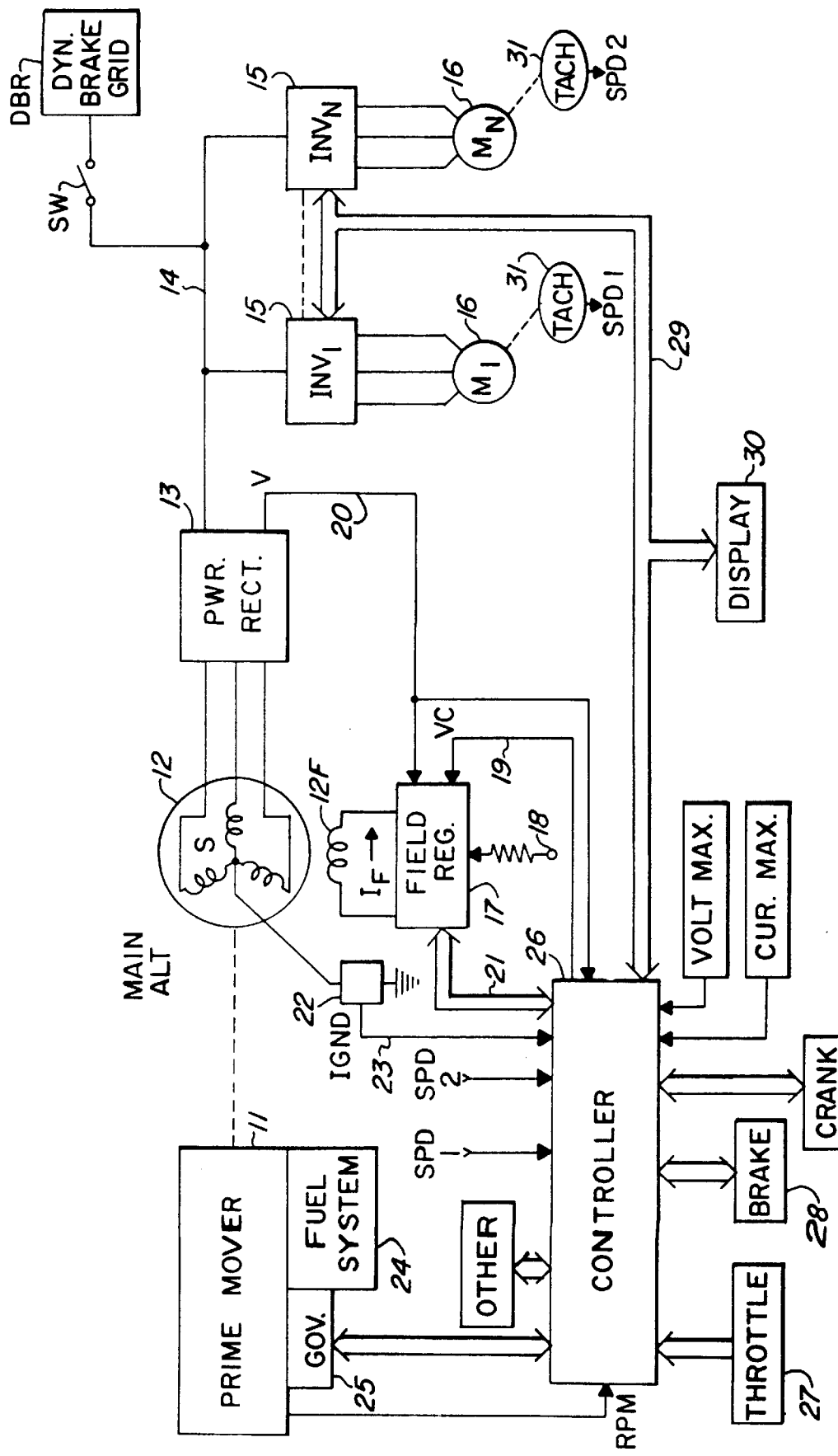
FIG. 1 is a simplified block diagram of an electrical propulsion system for a diesel electric locomotive.

The propulsion system shown in FIG. 1 includes variable speed prime mover 11 mechanically coupled to the rotor of a dynamoelectric machine 12 comprising a three-phase alternating current (AC) synchronous generator, also referred to as a main traction alternator. The main alternator 12 has a set of three star connected armature windings on its stator. In operation, it generates three-phase voltages in these windings, which voltages are applied to AC input terminals of at least one three-phase double-way uncontrolled power rectifier bridge 13. In a conventional manner, the bridge 13 is formed by a plurality of pairs of power diodes, each such pair of diodes being associated with each of the three different phases of the main alternator 12. The diodes in each pair are serially connected between relatively positive and negative direct current (DC) output terminals of the rectifier bridge, and their junction is connected by a protective fuse (not shown) to the respectively associated AC input terminal of the bridge. The output of the bridge 13 is electrically coupled, via DC link 14, in energizing relationship to a plurality of parallel connected, electrically controllable inverters 15, only two of which are shown in the illustrated embodiment. The inverters 15 are conventional three-phase inverters having a plurality of pairs of controllable rectifiers connected in such a manner that controlling the time at which each of the rectifiers is gated into conduction allows one to control the output frequency and power supplied by the inverters. The three-phase outputs of the inverters are connected to corresponding ones of the adjustable speed AC traction motors 16. Prime mover 11, alternator 12 and rectifier 13 are suitably mounted on the platform of a self-propelled 4-axle or 6-axle diesel electric locomotive. A locomotive platform is in turn supported on two trucks (not shown), each having two or more axle wheel sets. A separate one of the traction motors 16 is hung on each axle and its rotor is mechanically coupled via conventional gearing and driving relationship to the associated axle-wheel set.

The main alternator 12 of the power rectifier 13 serve as a controllable source of electric power for the traction motors. The magnitude of output voltage or current of the source is determined and varied by the amount of excitation current supplied to field windings 12F on the rotor of the main alternator. These field windings are connected for energization to the output of a suitable source 17 of regulated excitation current IF.

The excitation current source 17 may comprise a three-phase controlled rectifier bridge having input terminals 18 which receive alternating voltage from a prime mover driven auxiliary alternator that can actually comprise an auxiliary set of three-phase armature windings on the same frame as the main alternator 12. This source 17 is labeled field regulator in FIG. 1. It includes conventional means for varying the magnitude of direct current IF supplied to the alternator field 12F (and hence the output of the alternator 12) as necessary to minimize any difference between the value of a variable control signal VC on an input line 19 and a feedback signal on line 20 which, during motoring, is representative of the average magnitude V of the rectified output voltage of the main alternator 12. The voltage V is sensed by a conventional voltage sensing module (not shown) connected across the DC output terminals of the power rectifier and which may comprise a simple voltage divider of two or more resistors.

The prime mover 11 that drives the alternator field 12F is a thermal or internal combustion engine or equivalent. On a diesel electric locomotive, the motive power is typically provided by high horsepower, turbo-charged, 16 cylinder diesel engine. Such an engine has a fuel system 24 that includes a pair of fuel pump racks for controlling how much fuel oil flows into each cylinder each time an associated fuel injector is actuated by a corresponding fuel cam on engine cam shafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated controller 26, which signal is herein called speed command signal or the speed call signal. An engine speed signal (RPM) indicates the actual rotational speed of the engine crankshaft and hence the alternator field. The speed command signal for the engine governor system 25 and the excitation control signal VC for the alternator field current source 17 are provided by the controller 26. In a normal motoring or propulsion mode of operation, the values of these signals are determined by the position of a handle of a manually operated throttle 27 to which the controller 26 is electrically coupled. A locomotive throttle conventionally has eight power positions or notches (N) plus idle and shutdown. N1 corresponds to a minimum desired engine speed (power), while N8 corresponds to maximum speed and full power. With the throttle in its idle position, the controller 26 is operative to impose on the control signal VC a value corresponding to IF=0, and no traction power is produced by the main alternator 12. When the electrical braking of a moving locomotive is desired, the operator moves the throttle handle to its idle position and manipulates an interlocking handle of a companion brake control device 28 so that the main controller 26 is now supplied with a variable "brake call" signal. The controller sets up the alternator for minimum voltage. The AC motor will then build up flux and act as a generator. The amount of braking torque is then controlled by controlling the slip frequency of the AC motor by control of conduction of the inverted switching devices. During electrical braking, the energy generated by the motors is converted to DC through the inverters 15 and transferred to the DC link 14 to be dissipated in a braking resistance grid DBR. A switch SW disconnects the grid from DC link 14 during normal motoring.

For each power level of the engine there is a corresponding desired load. The controller 26 is suitably arranged to translate the notch information from the throttle 27 into a reference signal value which establishes a voltage output from the alternator required by the motors in order to generate the torque or power being called for by the notch position. For this purpose, as well as others, it is necessary to supply the controller 26 with information about various operating conditions and parameters of the propulsion system, including the engine.

As illustrated in FIG. 1, the controller 26 receives the above-mentioned engine speed signal RPM, DC link voltage feedback signal V, and AC voltage and current feedback signals representative of the magnitude of voltage and current supplied to the motors 16 from the inverters 15. The controller 26 also receives a load control signal issued by the governor system 25 if the engine cannot develop the power demanded and still maintain the called for speed. The load control signal is effective, when issued, to reduce the power reference value in the controllers 26 so as to weaken the alternator field until a new balance point is reached. Additional data supplied to the controller 26 includes "volt max" and "cur max" data that establish absolute maximum limits for the alternator output voltage and current respectively. The controller also receives "crank" data indicating whether or not an engine starting or cranking routine (start-up) is being executed and relevant inputs from other selected sources, as represented by the block labeled "Other". The alternator excitation source 17 and the controller communicate with each other via a multi-line serial data link or bus 21.

In a preferred embodiment of the invention, the controller 26 comprises a microcomputer. A person skilled in the art will understand that a microcomputer is actually a coordinated system of commercially available components and associated electrical circuits and elements that can be programmed to perform a variety of desired functions. In a typical microcomputer, a central processing unit (CPU) executes an operating program stored in an erasable and electrical reprogrammable read only memory (EPROM) which also stores tables and data utilized in the program. Contained within the CPU are conventional counters, registers, accumulators, flip-flops (flags), etc. along with a precision oscillator which provides a high frequency clock signal. The microcomputer also includes a random access memory (RAM) into which data may be temporarily stored and from which data may be read at various address locations determined by the program stored in the EPROM. These components are interconnected by appropriate address, data and control buses, one of such buses being indicated at 29 and shown connecting signals from the controller 26 to the inverters 15, and a display 30. The microprocessor used in the controller 26 may be a conventional processor of the type available from Intel Corporation or of the alternative type available from Motorola, Inc.

The controller 26 is programmed to produce, in the motoring mode of operation, a control signal value on the line 19 that varies as necessary to zero any error between the value of the alternator voltage feedback signal V and a reference value that normally depends on the throttle position selected by the locomotive operator and the traction power output of the main alternator. One method for implementing this control function is disclosed in U.S. Pat. No. 4,634,887. In order to implement an electrical braking mode of operation, the controller 26 is programmed to vary the conduction of the switching devices in the inverters in a manner to vary or control the slip frequency of the AC motors. The controller 26 also provides the signals necessary to control the timing of the firing of the rectifier devices within the inverters 15 in such a manner as to establish a desired frequency of operation of the power supplied by the inverters 15 to the motors 16 so as to control the speed of the locomotive. Suitable feedback means are also provided from the wheel axle sets of the locomotive by means 31 which may be conventional tachometers providing signals SPD to the controller 26. Conventionally, each wheel axle sets may be associated with a separate tachometer or speed sensor to provide multiple signals indicative of speed to the controller so as to be able to detect wheel slip or slide conditions.

While the above description of the controller 26 implies that the controller is strictly a voltage or current regulator, it will be appreciated that the conventional controller while regulating voltage and current output of the alternator 12 typically utilizes calculations of the actual power delivered to the motors 16 and by the actual horsepower or torque developed by the motors 16. Power and torque are quantities that are calculated within the controller 26 from the values of voltage and current supplied to the motors. Furthermore, each motor may also be supplied with flux sensing windings to enable a direct measurement of flux being developed within the motors or, in a preferred form, the AC terminal voltage and AC motor current is measured and used to estimate the flux developed by the motors. Torque or tractive effort can be estimated from motor flux multiplied by current. Horsepower can be estimated from the product of torque and frequency.

Figure 2:
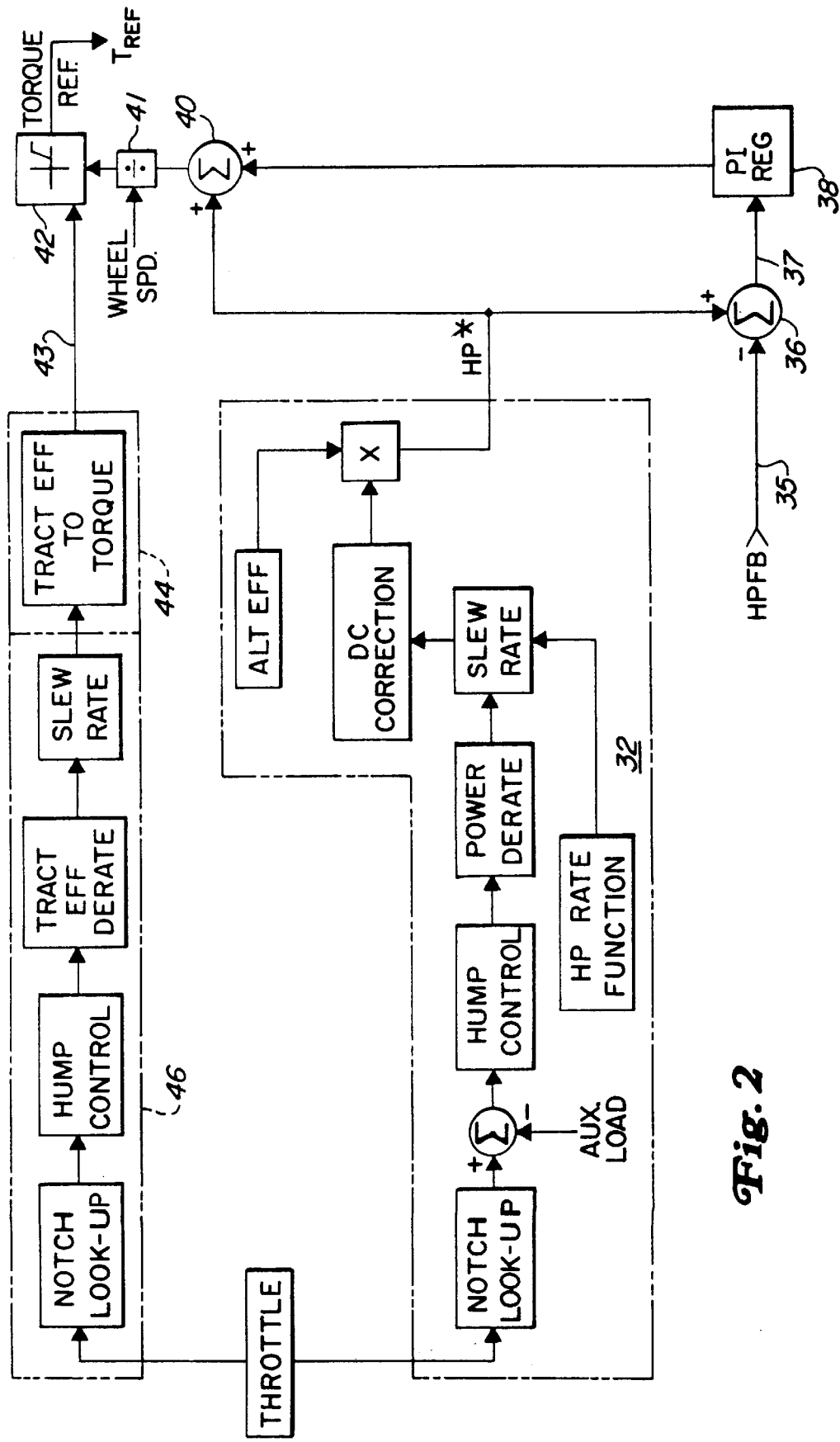
FIG. 2 is a simplified functional block diagram of a power control system in accordance with the present invention and implemented within the controller of FIG. 1.

Turning now to FIG. 2, there is shown a simplified functional block diagram of a portion of a control algorithm implemented within the microcomputer of controller 26. As discussed briefly above, the input command from the locomotive operator is a throttle position or motor power reference command indicated by a particular notch position of the throttle controlled by the operator. The throttle position is supplied to the controller 26 and a selected output voltage from the alternator 12 is generated for each notch position. The command or notch position is interpreted by the controller 26 and is modified by the amount of auxiliary load on the locomotive such as from other train cars, heaters and auxiliary items. This is typically a deration function that is necessary since the diesel engine 11 may be called upon to generate a maximum horsepower but the additional loads on the engine may not allow that amount of horsepower to be supplied to the driving wheels of the vehicles through the AC traction motors 16. Once the horsepower command has been adjusted by subtracting out the auxiliary loading, the resultant command is supplied through various functions such as a hump control, power deration circuit, and a slew rate limit circuit. All of these functions are described in the aforementioned U.S. Pat. No. 4,634,887. The slew rate limit circuit controls the rate at which horsepower is allowed to change within the system. The signal developed after modification by the slew rate limit circuit may be further modified to correct for alternator efficiency, i.e., the fact that the alternator may be only 95% efficient. The resulting signal becomes the net power reference signal. In FIG. 2, all of the above functions are implemented within the power control block 32 so that the output of the functional power control block 32 is the net power command signal HP* for the locomotive in a motoring mode. The control function sums the command signal with a power feedback signal HPFB representative of actual power generated to produce an error signal. More particularly, the HPFB power signal is subtracted from the net power signal HP* in a summing junction 36 to produce an error signal on line 37. The error signal represents the difference between the actual electrical power developed by the alternator 12 and the amount of power commanded by the particular notch position or throttle position set by the operator. This error signal is applied to a conventional proportional plus integral regulator 38 and a resultant integrated term is then supplied to a first input terminal of a summing junction 40. In summing junction 40, the error signal is added to the net power reference signal HP* to provide a power output command signal for setting the power output of the alternator 12 and controlling the operation of the inverters 15. The power command signal is applied to a divider 41 or is divided by wheel speed to obtain a signal proportional to torque. This torque signal is then applied to a torque limit circuit 42 which creates a torque reference command $T_{REF}$. The torque reference command is then used by the controller 26 to control inverters 15. The maximum allowable torque reference command is set by an input on line 43 from a torque converter 44 and tractive effort converter 46. These two functions operate conjointly to establish a tractive effort reference based on the locomotive operator's throttle notch position with tractive effort being converted to torque as a function of wheel diameter and gear ratio. Constraints, such as a conventional deration value and a slew rate limit, are placed on the torque reference and the resultant value is then applied to limit circuit 42 to establish a maximum limit on torque.

Figure 3:
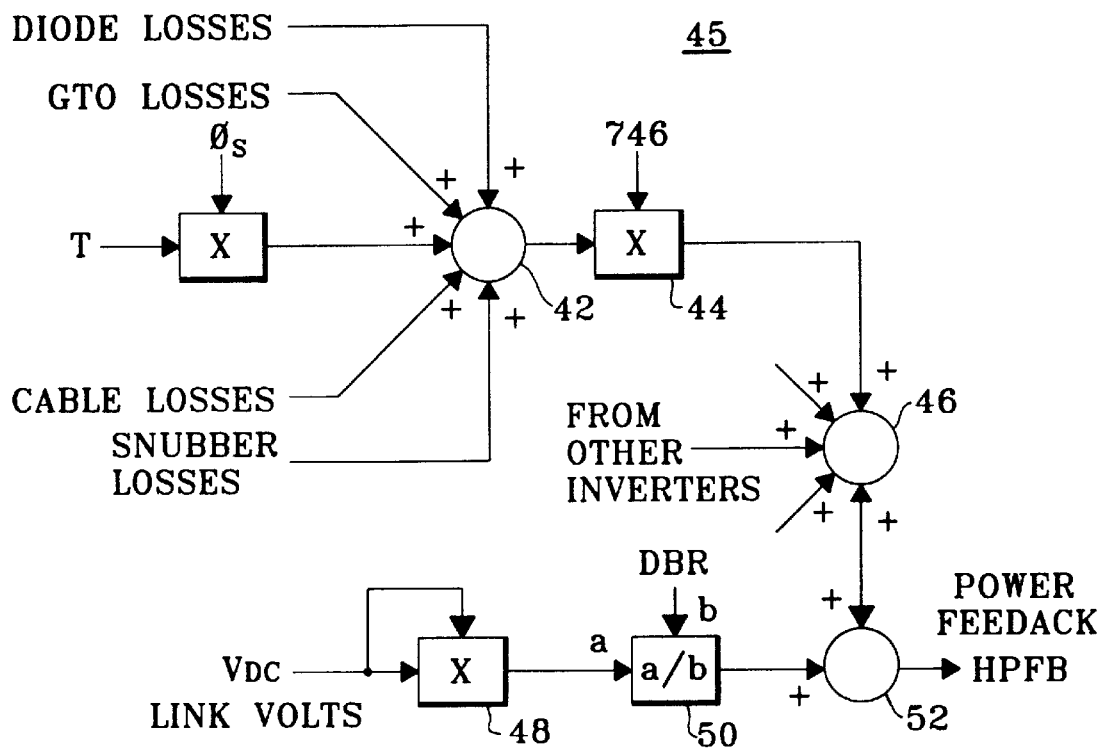
FIG. 3 is a functional block diagram showing one implementation of a program for determining alternator power without DC current sensing.

In prior art systems, the actual power generated is calculated by multiplying DC link voltage by DC link current. The present system eliminates the use of an expensive DC current sensor and provides a different process for determining actual power generated. Referring to FIG. 3, which illustrates one implementation of a system 45 for determining power feedback, the calculation of the power feedback signal requires a summation of all power losses and power use for each inverter and motor. The losses include diode and gate turn-off (GTO) device losses and snubber circuit losses in the inverters 15 and $I^2R$ (cable) losses in the system wiring. Power use, i.e., power used by the motors 16, can be determined from motor characteristics, measured values of voltage and current at the motor and the motor excitation frequency (synchronous frequency). The summation of losses and power used, block 42, is converted to an equivalent horsepower by dividing by 746 watts/horsepower, block 44. Block 46 represents summation of losses from all motor/inverter units.

FIG. 3 also illustrates the development of a power feedback signal during dynamic braking of the vehicle or during self-loading mode, i.e., when the locomotive is in a non-motoring test mode. In either of these modes, generated power is dissipated in the dynamic brake resistance grid DBR connected to the DC link 14. The grid DBR is a fixed, high power resistance element which is generally stable although some variation with temperature may occur and require adjustment for best accuracy using a thermal model, i.e., a model which relates resistance to temperature and which can be developed by empirical testing to create a table of values of grid resistance as a function of temperature. Given the resistance value of the grid, typically less than 0.5 ohm, power generated becomes equal to the square of the DC link voltage, block 48, divided by the resistance value DBR, block 50. Summation block 52 indicates that the power feedback signal is derived either from the power used and lost calculation or from the power dissipated in the braking grid. The resistance value DBR is set to an infinite value when switch SW is open.

The value of the dynamic brake resistance grid may vary from the nominal value specified by the manufacturer and therefore requires calibration in order to be used for horsepower measurement. One method of calibration in a shop environment is to measure voltage and current (using temporary shop sensors) during self-loading. Another method is to calibrate the DBR grid during actual field use when the locomotive is in a full dynamic braking mode from relatively high operating speed. In such condition, the voltage generated by the traction motors 16 is sufficiently high to bias the DC link 14 so that the diodes in the rectifier 13 are reverse biased and non-conducting. All the power on the link 14 is therefore supplied by the traction motors. Using the diagram of FIG. 3, if all the regenerative power is known from measuring AC voltage and current at each traction motor, and if all the losses are known, the power signal from summing junction 46 should equal the power signal developed by dividing the square of the DC link voltage by the value of the DBR resistance, i.e., the HPFB signal should be zero. If the HPFB signal is not zero, the value of DBR can be adjusted, i.e., calibrated, to bring the HPFB signal to zero. The calibrated value of DBR can then be used for self-load or dynamic brake control schemes.

Figure 4:
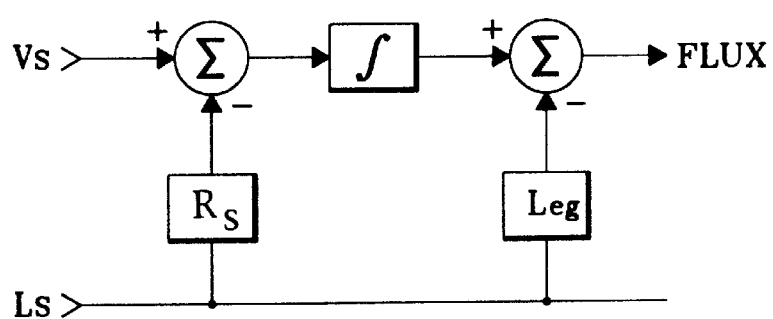
FIG. 4 illustrates a conventional motor equivalent circuit for calculating motor flux to determine motor torque.

FIG. 4 illustrates one method for determining electrical torque of one of the motors 16. The controller 26 implements a motor model 54 using known values of stator resistance $R_S$ and motor equivalent leakage inductance Leq, both of which values are provided by the motor manufacturer. The motor model 54 of FIG. 4 is well known in the art and uses stator voltage and stator current (the monitored AC motor voltage and current) to compute motor flux. The value of electrical torque T is given by the relationship $$T = 3/2 \cdot P/2 \cdot L_M/L_t(\lambda_{dr} \cdot i_{qs} - \lambda_{qr} \cdot i_{ds})$$

where P is the number of motor poles, $L_m$ and $L_l$ are mutual and leakage inductance, respectively, $\lambda_{dr}$ is the rotor flux along the direct axis, $\lambda_{qr}$ is the rotor flux along the quadrature axis, $i_{qs}$ is the stator current along the quadrature axis and $i_{ds}$ is the stator current along the quadrature axis. The electrical power input to the motor, excluding stator $i^2R$ losses, is the product of torque T times synchronous speed or excitation frequency $N_s$. Excitation frequency is known since the controller 26 specifies that frequency to the inverters 15. Accordingly, the power used by the motors 16 can be calculated from measured values of applied AC voltage and AC current.

Figure 5:
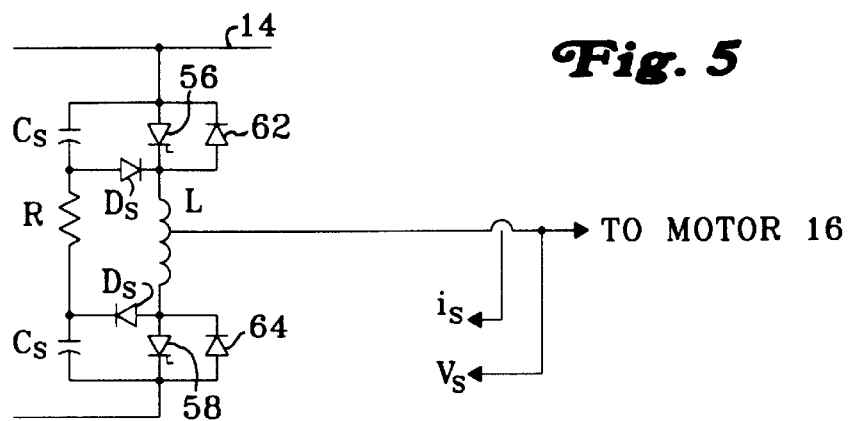
FIG. 5 illustrates an exemplary leg of a three-phase inverter for which power losses can be determined.

Each of the inverters 15 comprise three parallel connected switching circuits for generating three phase controlled frequency voltage for application to motors 16. The form of inverter switching circuit is sometimes referred to as pulse width modulation (PWM). Such inverters are well known in the art and a detailed description is not believed necessary. FIG. 5 illustrates an exemplary embodiment of one leg of an inverter, three such legs being required for a three phase inverter. Each leg includes two series connected switching devices 56 and 58, such as the illustrated GTO devices, connected across DC link 14. A split inductor L is interposed between the devices 56, 58 with the pulse width modulated (frequency controlled) output taken at a center tap of inductor L. Each GTO switching device 56, 58 is bypassed by a reversely poled, parallel diode 62, 64, respectively. Corresponding snubber circuits each comprising a capacitor $C_S$ and diode $D_S$ are connected in circuit with each device 56, 58 and a resistor R couples the snubber circuits. The power loss $P_{LS}$ in the snubber circuits is calculated by $P_{LS}=CV_s^2f+ 1/2\ Li^2f$ where $V_s$ is the output voltage (motor stator voltage), $i_s$ (motor stator current) is the output current, f is the switching frequency and C and L are the capacitance and inductance of devices C and L.

The losses in the GTO switching devices 56, 58 and associated diodes 62, 64 are described in detail in co-pending U.S. patent application Ser. No. 08/633,390, the disclosure of which is hereby expressly incorporated by reference. The cable losses, i.e., the losses in the electrical conductors between the DC link 14 and the motors 16 is merely an $I^2R_C$ loss, where $R_C$ is the total resistance of the conductors obtained by conventional measurement and I is the RMS value of the current $i_s$ sensed at the motors. Accordingly, each of the loss items and power used for the implementation of FIG. 2 can be derived as shown in FIGS. 3–5 without direct measurement of DC link current.

In prior art systems, the DC link current was used to identify a shoot-through condition. A shoot-through occurs, for example, if one of the switching devices 56, 58 fails to a short circuit condition and the other of the devices is then gated into conduction. The present system monitors the DC link voltage during locomotive operation and checks for a rapid drop in voltage to about zero volts with the voltage staying low for a minimum time interval, such as, for example, about 100 milliseconds (to eliminate detection of noise), such an occurrence being indicative of a shoot-through condition. If shoot-through occurs, the controller 26 can shut-down inverter operation until the failure can be localized to a particular inverter as described in U.S. patent application Ser. No. 08/633,390.

A short-circuit condition is different than a shoot-through condition in that the short circuit exists at start-up before voltage on the DC link has risen to its normal high value. Without voltage to monitor for rapid drops, other methods of detection are necessary. A preferred method is to create a computer model of the alternator 12 as a function of DC link voltage $V_{DC}$, engine speed RPM and alternator field current $I_f$ so that the model produces an estimated value of DC link current $I_{DCE}$.

Figure 6:
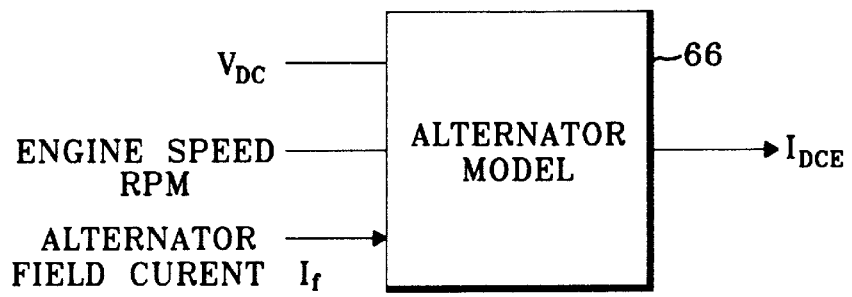
FIG. 6 illustrates a circuit model for estimating alternator current.
Figure 7:
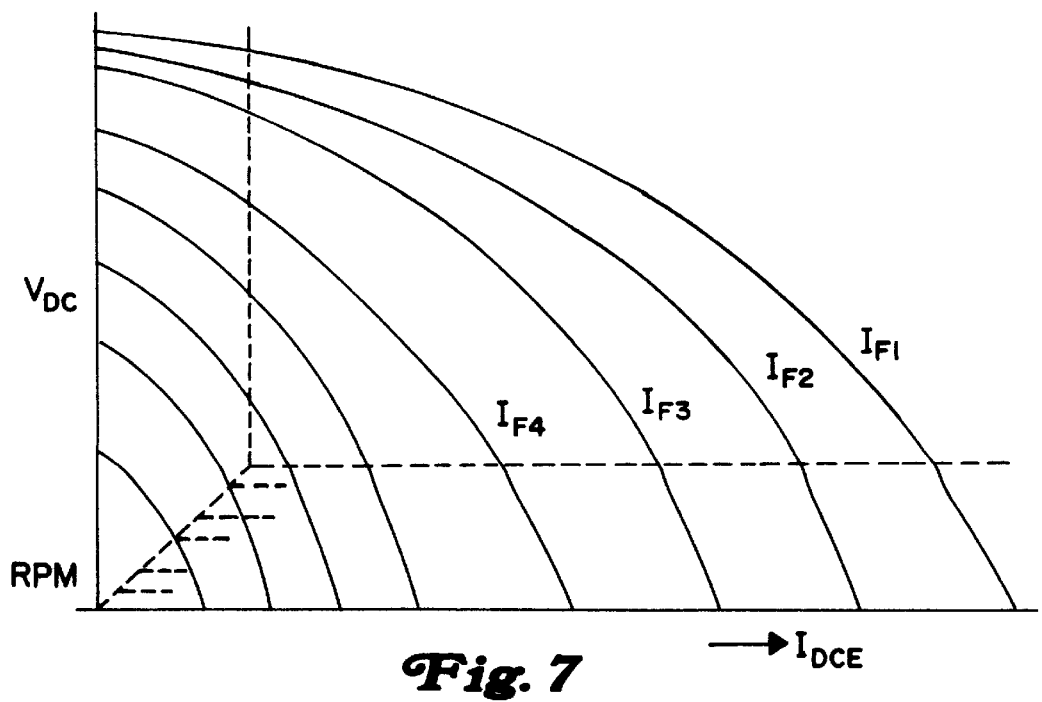
FIG. 7 illustrates a set of graphs for determining alternator current from other quantities.

FIG. 6 illustrates a simple alternator model 66 which can be a series of look-up tables containing data corresponding to graphs of the type shown in FIG. 7. The tables are organized to represent a three-dimensional model, for example, with engine speed RPM representing a Z axis, DC link voltage $V_{DC}$ representing a Y axis and $I_{DCE}$ (estimated value of DC link current) representing an X axis. The values of alternator field current $I_f$ create a series of curves $I_{11}$, $I_{12}$, etc., for each value of RPM. Accordingly, for any set of values of $V_{DC}$, RPM and $I_f$, a corresponding value of $I_{DCE}$ can be obtained from the tables of the model.

A short-circuit condition can be detected by computing the value of $V_{DC}$ divided by $I_{DCE}$, as shown in FIG. 6, to derive a value of estimated circuit resistance $R_{EST}$. If the value of $I_{DCE}$ is greater than some selected minimum value, e.g., 100 amps, so as not to be confused with transient signals and if the value of $R_{EST}$ is less than some other selected minimum value, e.g., 20 milliohms, for at least a selected minimum time interval, then a short-circuit is presumed and start-up aborted.

A system and method for controlling operation of a high horsepower electric traction motor vehicle without direct monitoring of DC current has been disclosed. While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed:

1. A method for controlling operation of a diesel electric traction vehicle of the type including a synchronous generator driven by a diesel engine for producing alternating current (AC) electric power, the AC electric power being converted to direct current (DC) electric power and transferred over a DC link to a plurality of DC to AC inverters, each of the inverters being coupled to transfer controlled frequency power to at least one AC electric traction motor coupled in driving relationship to at least one wheel-axle set of the vehicle, a computer based control system for controlling operation of the engine, generator and inverters in response to a power command to enable operation of the vehicle, the method comprising the steps of:

computing power supplied by the generator from calculated torque developed by the AC traction motors and electric power losses in the circuit elements coupling power from the generator to the motors;

comparing the computed power to the commanded power; and adjusting engine operation so as to minimize any difference between the commanded power and the computed power.

2. The method of claim 1 wherein the step of computing power includes the steps of measuring AC current and AC voltage at each motor, calculating motor flux from the measured values of current and voltage, calculating electric torque from the calculated flux and converting the calculated torque to electrical power.

3. The method of claim 1 and including the step of detecting a short-circuit condition in the inverters by monitoring voltage rate of change on the DC link and detecting a voltage drop to a relatively low value for a predetermined time interval.

4. The method of claim 1 and including the steps of:

creating a computer model of the generator, said model having a Z-axis representing engine speed, a Y-axis representing DC link voltage, and an X-axis representing estimated value of DC link current, wherein field current is represented by a curve in said coordinate system, and wherein the model provides an estimated value of DC link current as a function of field current, DC link voltage and engine speed;

measuring DC link voltage and dividing the measured voltage by the computed value of DC link current to obtain an estimated value of load resistance; and providing a signal indicative of a shorted DC link when the computed value of DC link current exceeds a preselected maximum value and the estimated value of load resistance is less than a preselected minimum value for more than a minimum time interval.

5. A system for controlling operation of a diesel electric traction vehicle of the type including a synchronous generator driven by a diesel engine for producing alternating current (AC) electric power, the AC electric power being converted to direct current (DC) electric power and transferred over a DC link to a plurality of DC to AC inverters, each of the inverters being coupled to transfer controlled frequency power to at least one AC electric traction motor coupled in driving relationship to at least one wheel-axle set of the vehicle, a computer based control system for controlling operation of the engine, generator and inverters in response to a power command to enable operation of the vehicle, comprising:

means for computing power supplied by the generator from calculated torque developed by the AC traction motors and electric power losses in the circuit elements coupling power from the generator to the motors;

a comparator for comparing the computed power to the commanded power; and means for adjusting engine operation so as to minimize any difference between the commanded power and the computed power.

6. A method for controlling operation of a diesel electric traction vehicle of the type including a synchronous generator driven by a diesel engine for producing alternating current (AC) electric power, the AC electric power being converted to direct current (DC) electric power and transferred over a DC link to a plurality of DC to AC inverters, each of the inverters being coupled to transfer controlled frequency power to at least one AC electric traction motor coupled in driving relationship to at least one wheel-axle set of the vehicle, a computer based control system for controlling operation of the entire engine, generator, inverters and a dynamic brake resistance grid coupled in circuit with the DC link for dissipating regenerative electrical power from the motors during electrical retarding of the vehicle in response to a power command to enable operation of the vehicle, the method comprising the steps of:

computing power supplied by the generator from calculated torque developed by the AC traction motors and electric power losses in the circuit elements coupling power from the generator to the motors;

comparing the computed power to the commanded power;

adjusting engine operation so as to minimize any difference between the commanded power and the computed power; and computing power during self-loading of the vehicle by measuring the DC link voltage, squaring the value of the measured voltage and dividing the squared value by the value of the resistance of the brake grid.

7. The method of claim 6 and including the step of correcting the value of grid resistance for temperature using a grid thermal model.

8. The method of claim 7 and including the step of calibrating the value of grid resistance during electrical braking of the vehicle by equating the computed power to the power dissipated in the grid wherein the grid resistance is equal to the square of the DC link voltage divided by the computed power.

* * * * *